(12) United States Patent
Abts et al.

(10) Patent No.: US 10,582,671 B2
(45) Date of Patent: *Mar. 10, 2020

(54) IRRIGATION SYSTEM WITH DUAL ALIGNMENT SENSORS

(71) Applicant: Irrovation LLC, Omaha, NE (US)

(72) Inventors: Gerald L. Abts, Denver, CO (US); Kevin J. Abts, Broomfield, CO (US)

(73) Assignee: Fieldbot, LLC, Newport Beach, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/487,751

(22) Filed: Apr. 14, 2017

(65) Prior Publication Data

US 2017/0295730 A1  Oct. 19, 2017

Related U.S. Application Data

(60) Provisional application No. 62/324,682, filed on Apr. 19, 2016.

(51) Int. Cl.
  *A01G 25/09*  (2006.01)
  *A01G 25/16*  (2006.01)
  *B05B 15/658* (2018.01)

(52) U.S. Cl.
  CPC .......... *A01G 25/092* (2013.01); *A01G 25/16* (2013.01); *B05B 15/658* (2018.02)

(58) Field of Classification Search
  CPC .... A01G 25/092; A01G 25/16; B05B 15/069; B60K 1/02
  USPC .................................................. 239/728, 731
  See application file for complete search history.

(56) References Cited

U.S. PATENT DOCUMENTS

| | | | |
|---|---|---|---|
| 3,807,436 A | 4/1974 | Pringle | |
| 3,823,730 A | 7/1974 | Sandstrom et al. | |
| 3,979,062 A * | 9/1976 | Christensen | A01G 25/092 239/11 |
| 4,034,778 A | 7/1977 | Sage et al. | |
| 4,580,731 A * | 4/1986 | Kegel | A01G 25/092 239/731 |
| 6,755,362 B2 | 6/2004 | Krieger et al. | |
| 8,948,979 B2 * | 2/2015 | Malsam | A01G 25/092 701/50 |
| 2003/0066912 A1 * | 4/2003 | Krieger | A01G 25/092 239/731 |

* cited by examiner

*Primary Examiner* — Chee-Chong Lee
*Assistant Examiner* — Christopher R Dandridge
(74) *Attorney, Agent, or Firm* — Dorr, Carson & Birney PC

(57) ABSTRACT

An irrigation system with an alignment detector uses a plurality of discrete sensors to detect and measure each irrigator span's misalignment when moving in either direction. In particular, this sensor alignment detector utilizes a first sensor for the forward movement direction and a second sensor for the reverse movement direction, which provides a significant improvement in alignment optimization and sensitivity.

3 Claims, 6 Drawing Sheets

IRRIGATION SYSTEM WITH DUAL ALIGNMENT SENSORS

RELATED APPLICATION

The present application is based on and claims priority to the Applicant's U.S. Provisional Patent Application 62/324,682, entitled "Irrigation System With Dual Alignment Sensors," filed on Apr. 19, 2016.

BACKGROUND OF THE INVENTION

Field of the Invention

The present invention relates to an irrigation system for conveying a fluid from a fluid source through interconnected spans wherein an alignment mechanism maintains alignment of the respective spans.

Statement of the Problem

The present invention involves an irrigation system having a series of irrigator spans having conduits for conveying an applicant such as water. The present invention relates to various types of irrigation systems including linear and lateral move irrigation systems, however, the primary type of irrigation system used for this purpose is called a center pivot irrigation system. Such systems include a center pivot tower about which the entire system rotates. The center pivot tower is connected to the water source for supplying water to the irrigation system. The irrigation system further includes a series of irrigator spans having conduits for conveying the water. Each irrigator span is connected to the adjacent irrigator span in an end-to-end manner at a joint that may include an external ball and socket connection, an external gimbal ring assembly, an external tongue and pin assembly, or an internal hook and receiver assembly. A flexible coupling, such as a flexible hose or boot, is used to connect the conduits of adjoining irrigator spans such that each conduit is in fluid communication with the next. The conduit of the irrigator span positioned adjacent to the center pivot tower is connected to the center pivot tower and the water source. Water is pumped from the water source through the center pivot tower and to the conduits of each irrigator span and is applied to the field through discharge nozzles mounted to the conduits. The irrigation system may include a plurality of irrigator spans, typically 100 feet to 200 feet in length, capable of reaching a few acres or hundreds of acres of the field. The irrigator spans are each moved about the center pivot tower by a drive system located at each intermediate tower structure and at an end tower structure. Each irrigator span includes its own drive system for moving the irrigator span radially about the center pivot tower. In prior art irrigation systems, an alignment mechanism interconnects each pair of connected irrigator spans near the flexible joint to maintain radial alignment between the irrigator spans within a predetermined limit.

The prior art in this field includes span alignment systems that provide an on-and-off signal to a reversible, constant-speed drive motor to maintain the irrigator spans in substantial radial alignment in both a forward movement direction and a reverse movement direction. U.S. Pat. No. 4,034,778 (Sage et al.), U.S. Pat. No. 3,823,730 (Sandstrom et al.) and U.S. Pat. No. 3,807,436 (Pringle) disclose a means of alignment dependent on cycling drive motors on and off to maintain alignment within defined parameters. For the past forty-five years, the on-and-off cycling of constant-speed drive motors has been the conventional means of maintaining alignment among the plurality of irrigator spans of center pivot irrigation systems. Such on and off cycling of constant-speed drive motors results in excessive wear on drive components and on the drive motor.

To mitigate the excessive ware on drive components and drive motors, more recent prior art discloses alignment systems that use sensors to detect degrees of misalignment between adjacent irrigator spans and in turn signal variable-speed drive motors to operate continuously but at varied speeds or RPM (revolutions per minute) rather than simply turn on at a constant speed (e.g., 1,750 RPM) and then turn off as needed to maintain alignment within a predetermined limit.

U.S. Pat. No. 6,755,362 (Krieger et al.) and U.S. Pat. No. 8,948,979 (Malsam) disclose the use of a sensor at each drive tower to detect misalignment between adjacent irrigator spans and vary drive motor speeds to maintain alignment, rather than cycling motors on and off to maintain alignment. These variable-speed alignment systems take advantage of technologies that employ variable-speed drive motors with continuous movement, in lieu of constant-speed drive motors with on and off movement.

In particular, Krieger discloses an irrigation system, such as a center pivot irrigation system, that includes an alignment mechanism, i.e., alignment detector, to measure the degree of misalignment between two adjacent irrigator spans. This irrigation system has a variable-speed drive system that uses a sensor, described as a potentiometer, to signal a degree of misalignment of an irrigator span of an irrigation system in relation to an adjacent irrigator span. Krieger further discloses that such sensor can be any of a number of types of sensors such as dual wiper or dual directional potentiometers, rotary potentiometers, and so on. In application, such use of a single sensor to measure misalignment, as disclosed by Krieger, limits the sensitivity of misalignment detection because of differing mechanical hysteresis of the irrigator span structural and alignment components in a forward movement direction as compared to a reverse movement direction and also because of potential electrical variations in the elements used to vary the speed of movement of the irrigator spans in a forward movement direction as compared to a reverse movement direction.

Malsam discloses an irrigation system that includes an alignment mechanism, i.e., alignment detector, to measure the degree of misalignment between two adjacent irrigator spans. Again, like Krieger, Malsam discloses a variable-speed drive system that uses a single sensor to detect misalignment, regardless of the direction of travel. Malsam discloses potential sensors to include sensors such as potentiometers, capacitive alignment sensors, laser-based alignment sensors, non-contact proximity sensors, or other devices capable of quantifiably measuring the irrigator span alignment. Like Krieger, Malsam discloses the use of a single sensor to signal a degree of misalignment of an irrigator span of an irrigation system in relation to an adjacent irrigator span. Also, the same as Krieger, Malsam's use of a single sensor to measure misalignment limits the sensitivity of misalignment detection because of differing mechanical hysteresis of the conventional irrigator span structural and alignment components in a forward movement direction as compared to a reverse movement direction as disclosed above.

Both Krieger and Malsam disclose the use of a single sensor at each span juncture, i.e., flexible joint, to detect a degree of misalignment between adjacent irrigator spans. Both Krieger and Malsam disclose that in application the single sensor can be any number of types of sensors such as dual wiper or dual directional potentiometers, rotary potentiometers, capacitive alignment sensors, laser-based alignment sensors, non-contact proximity sensors, or other devices capable of quantifiably measuring the irrigator span alignment. Those familiar with the operation of center pivot irrigation systems may know that optimal span alignment in each movement direction, i.e., either a forward movement direction or a reverse movement direction, may result in a slight bow in the direction of movement or travel among the plurality of irrigator spans. This bowed condition may result from the forces at each drive tower supporting each span to project the drive wheels to move tangentially to the circumference of the respective wheel track, such discrete movement being associated, respectively, with both the forward movement direction and the reverse movement direction. In other words, the drive towers are each attempting to progress in a straight line, i.e., tangentially to the circumference of the wheel track, in either a forward movement direction (clockwise) or a reverse movement direction (counter-clockwise); but all drive towers are held and restrained by the center pivot tower, causing the drive tower of each span to pivot in a circular pattern and with varying tension among the plurality of respective irrigator span structures and between corresponding adjacent irrigator spans.

The dynamic tension forces resulting from a center pivot being operated may be understood from the series of movements that begin with the movement of the last or outermost drive tower that also controls the overall pace of movement of the entire roving pivot arm over the field. The last (outermost) drive tower is positioned to move tangentially to its corresponding circular wheel track, in either a forward movement direction or reverse movement direction. Assume a forward movement direction (clockwise). Once such forward movement commences the last drive tower begins to lead the remaining stationary and aligned intermediate drive towers. Because the entire roving pivot arm is attached to the stationary center pivot tower, the last drive tower is forced to move in a circular pattern about its corresponding wheel track. As the last drive tower pivots about the stationary adjacent intermediate drive tower, i.e., next-to-last drive tower, a corresponding alignment detector, using a sensor, signals the adjacent intermediate drive tower to move forward at a pace that realigns the adjacent intermediate irrigator span with the last irrigator span, even as the last irrigator span is continuously moving at an operator selected ground speed. This adjacent intermediate drive tower is also configured to move tangentially to its corresponding circular wheel track. Just as with the last drive tower, the adjacent intermediate drive tower's tangential movement is restricted by the center pivot tower, causing both the last drive tower and the next-to-last, intermediate drive tower to move in corresponding circular paths with varying tension among the plurality of respective irrigator span structures and between corresponding adjacent irrigator spans.

Once such forward movement of the adjacent intermediate drive tower commences, the last drive tower and the adjacent, next-to-last, intermediate drive tower begins to lead any remaining stationary intermediate drive towers. This movement cycle may continue with each corresponding intermediate drive tower to result in a substantially aligned plurality of intermediate irrigator spans, under tension, with a slight leading bow of the last drive tower in the direction of movement.

The forces created when a roving center pivot arm begins to move, in either a forward movement direction or a reverse movement direction, may result in considerable mechanical hysteresis, causing mechanical stress and movement among the structural components, particularly those flexible components that are part of the irrigator span's flexible joint structure at each respective drive tower. This hysteresis may be caused by backlash or elastic deformation but is mainly caused by frictional effects among the assembled components of the center pivot structure. Also, variables such as topography underlying the plurality of irrigator spans, may create mechanical hysteresis when a roving center pivot arm moves. Such forces may create mechanical hysteresis having a different signature in a forward movement direction than in the reverse movement direction. For example, at a given point in the field, the wheels of a drive tower of a corresponding irrigator span may be moving uphill in a forward movement direction, but moving downhill in a reverse movement direction. The uphill verses downhill movement may result in very different mechanical hysteresis, even though the only variables may be the direction of movement and the uphill verses downhill topography. In other words, the alignment detector, using a single sensor as disclosed by Krieger and Malsam to detect misalignment, may result in a different alignment result in a forward movement direction as compared to the alignment result from the same alignment detector when moving in a reverse movement direction, and vice versa.

Center pivot structures are, by design, built to withstand tension forces created by the irrigator spans trying to move tangentially to the circular path, but being forced to pivot about the center pivot tower that restricts each irrigator span's movement to a corresponding circular path. Furthermore, center pivot structures are not designed to withstand significant compression among the irrigator spans. Adjusting alignment to result in a corresponding, slight, leading bow in either movement direction provides the needed tension and mitigates unwanted compression among the irrigator spans as the irrigator spans pivot in their corresponding circular paths about the center pivot tower. Use of a single sensor to detect misalignment in both the forward movement direction and the reverse movement direction may result in a sub-optimal alignment result in one or both directions. This is the problem addressed by the present invention.

Solution to the Problem

The present invention employs an alignment detector with dual sensors. Because center pivots operate in both a forward movement direction and a reverse movement direction, alignment of the irrigator spans of a center pivot irrigation system in both a forward movement direction and a reverse movement direction using a single sensor may result in sub-optimal alignment properties. Neither Krieger nor Malsam address this issue and both inventors assume adequate alignment by using one sensor for maintaining alignment among the plurality of irrigator spans, regardless of the direction of movement. The present invention discloses a means to significantly improve on the single sensor method of irrigator span alignment as first disclosed by Krieger and later repeated by Malsam.

More specifically, the present invention uses two sensors in lieu of one sensor to detect misalignment and maintain proper alignment of each of the plurality of irrigator spans of a center pivot irrigation system. The first sensor signals the alignment status in a forward movement direction and the second sensor signals the alignment status in a reverse movement direction. This addition of a second sensor enables discrete sensing for each movement direction and enables the adjustment of the alignment between adjacent irrigator spans to be optimally and independently set for each movement direction, regardless of varying mechanical hysteresis that may result from a particular movement direction. The prior art disclosed by Krieger and Malsam uses only a single sensor that must serve to provide alignment detection in both directions. The present invention improves span alignment by enabling the achievement of an optimum leading bow that provides tension throughout the plurality of irrigator spans and between adjacent irrigator spans in both movement directions. Using two sensors, one for each movement direction, the corresponding desired leading bows can be achieved independently for the forward movement direction and for the reverse movement direction, thus mitigating the effects of varying mechanical hysteresis resulting from the direction of travel. Using two sensors in lieu of one sensor to detect misalignment and maintain proper alignment of each of the plurality of irrigator spans of a center pivot irrigation system results in a more precise alignment in both movement directions among the plurality of irrigator spans, and, in turn, reduces structural stresses.

SUMMARY OF THE INVENTION

This invention provides an irrigation system with an alignment detector that uses a plurality of discrete sensors to detect and measure each irrigator span's misalignment. This sensor alignment detector utilizes a first sensor for the forward movement direction and a second sensor for the reverse movement direction. This method makes possible a significant improvement in alignment optimization and sensitivity as compared to the prior art of Krieger and Malsam that both use one sensor for detecting and measuring misalignment among the plurality of irrigator spans, regardless of movement direction.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
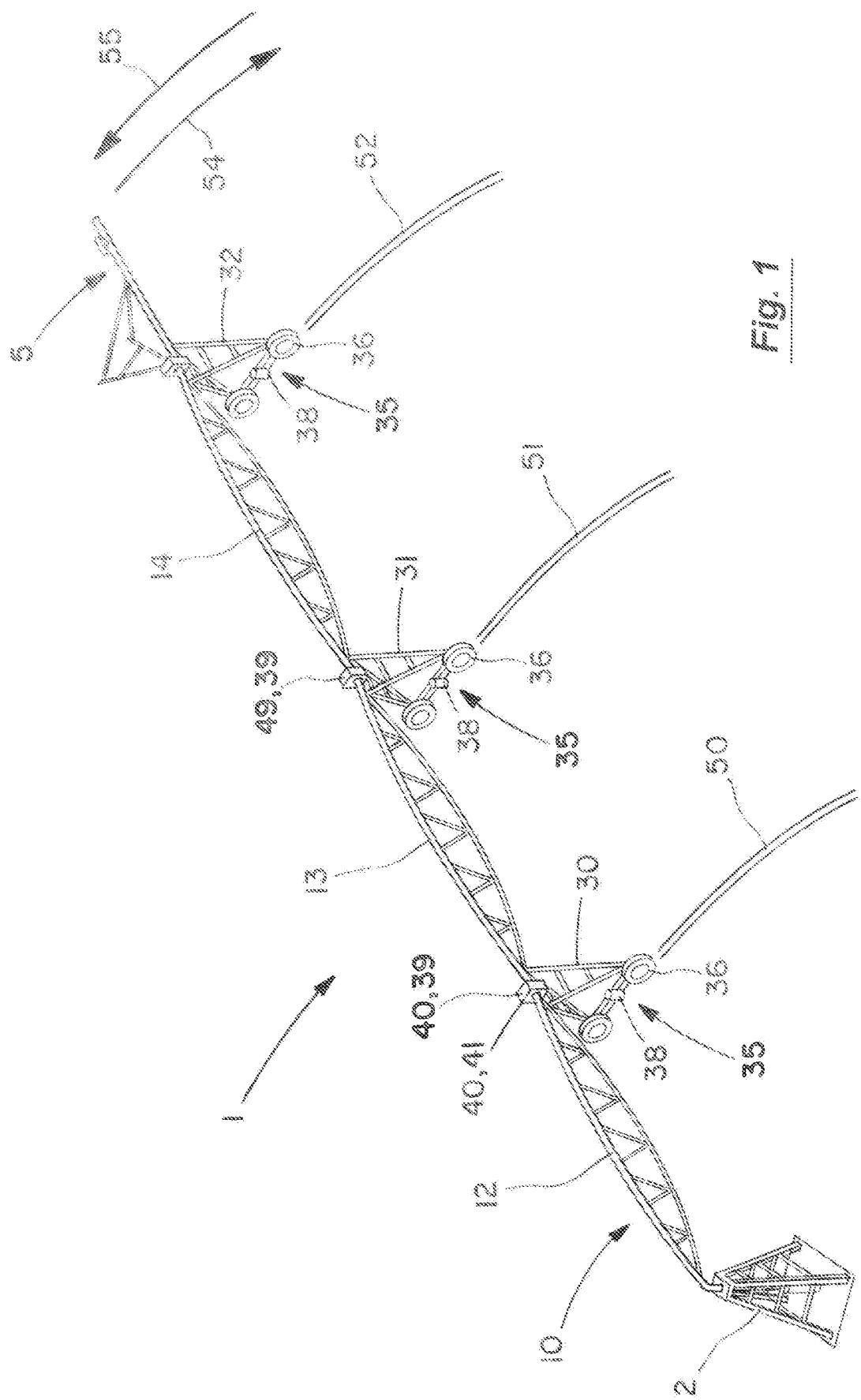
FIG. 1 is a perspective view of an irrigation system 1 embodying the present invention.

Irrigation systems, such as linear and lateral move irrigation systems and center pivot irrigation systems, generally include fixed-speed drive assemblies at each of the intermediate tower structures to propel the irrigation systems over a respective ground surface, cultivation area or field. Such irrigation systems rely on span motors with fixed-rate speeds, RPM, of the central shafts of the rotors of such span motors due to their relative simplicity and robustness. Such systems, however, can only maintain the relative alignment of various irrigator spans by repeated on-and-off control cycling of the corresponding span motors as roving irrigator spans change states of alignment in either a forward movement direction or a reverse movement direction. This method of maintaining substantial alignment among the plurality of irrigation spans results in each intermediate tower structure coming to a complete stop and then requiring a large impulse of power to the corresponding fixed-speed span motor to start the intermediate tower structure moving again. These strenuous and repetitive start-and-stop movements that result from repeated on-and-off control cycling of the corresponding span motors may result in excessive stress on structures, e.g., transitions from tension to compression among adjacent irrigator spans, excessive wear on components, and unintended downtime of the irrigation system. The irregular, start and stop motion caused by these strenuous and repetitive start-and-stop movements in order to maintain a substantial straight alignment of the irrigator spans can also cause uneven application of irrigation water and/or chemicals to the field. This may result in waste of both water and chemicals. The irregular motion may also cause deviations in alignment or errors in determining the position of the end tower structure of the machine. This can result in errors in operations based on pivot arm position as determined at the center pivot tower structure.

Accordingly, irrigation systems have been proposed that provide variable-speed drive assemblies. Both Krieger (U.S. Pat. No. 6,755,362) and Malsam (U.S. Pat. No. 8,948,979) have disclosed using a single sensor, such sensors being any number of types of sensors, to signal the degree of misalignment to a variable-speed drive controller of a variable-speed drive assembly to maintain a substantial straight alignment among a plurality of adjacent irrigator spans. This contrasts with the irregular motion caused by the strenuous and repetitive start-and-stop movements of the legacy alignment systems using limit switches, wherein corresponding span motors are repeatedly control cycled between span motor on and span motor off as described above. In an implementation of Krieger and Malsam, an irrigation system includes multiple interconnected irrigator spans that are supported by multiple tower structures. Each intermediate tower structure may include a variable-speed drive assembly that may include a variable-speed drive controller that varies aspects of the supply power furnished to the corresponding span motor to vary the speed of movement of the respective variable-speed drive assembly in either a forward movement direction or a reverse movement direction. As disclosed by Krieger and Malsam, such variable-speed drive controllers may each receive signals from a sensor, such signals used by the variable-speed drive controller to adjust the speed of the corresponding span motor to maintain irrigator span alignment. Both Krieger and Malsam also disclose that in application such single sensor can be any number of types of sensors such as dual wiper or dual directional potentiometers, rotary potentiometers, capacitive alignment sensors, laser-based alignment sensors, non-contact proximity sensors, or other devices capable of quantifiably measuring the irrigator span alignment.

In the variable-speed drive controllers disclosed by Krieger and Malsam, each variable-speed drive assembly of the intermediate irrigator spans of the irrigation system may include an alignment detector that may include a single sensor, e.g., a potentiometer, a capacitive alignment sensor, a GPS (global positioning system)-based alignment sensor, a laser-based alignment sensor, a non-contact proximity sensor, or any other device capable of signaling varying states of alignment, and the like, configured to detect and output varying states of misalignment. Within each variable-speed drive assembly, the alignment detector is in communication with a corresponding variable-speed drive controller. Each variable-speed drive controller is configured to monitor and process the output of the corresponding alignment detector, that includes a single sensor, and, based on the output of the alignment detector, the variable-speed drive controller may be configured to control the irrigator span motor to increase or decrease speed so as to maintain the interconnected irrigator spans in a substantially linear orientation to the respective longitudinal axes of the irrigator spans, i.e., maintain substantial straight alignment of the irrigator spans with respect to each other. The single sensor included in each alignment detector of each variable-speed drive assembly signals varying degrees of misalignment of the irrigator spans in both the forward movement direction and the reverse movement direction. Such single sensor detects movement, and, thereby, degrees of misalignment, in the variable-speed drive assembly's mechanical components at each intermediate tower structure as the corresponding irrigator span moves in either a forward movement direction or a reverse movement direction. In contrast to both Krieger and Malsam, the present invention discloses the use of dual alignment sensors, one alignment sensor for the forward movement direction and a second alignment sensor for the reverse movement direction.

The following is an example of an implementation of the present invention using variable-speed drive assemblies. FIG. 1 illustrates a center pivot irrigation system 1 in accordance with an embodiment of the present invention using variable-speed drive assemblies 35, each with a variable-speed drive controller 39 using a dual sensor alignment detector 49 with a first sensor 40 and a second sensor 41. These first and second sensors 40, 41 are configured to detect misalignment of each intermediate irrigator span 12, 13 and end irrigator span 14. Each of the sensors 40, 41 of the dual sensor alignment detector 49 is dedicated to detecting misalignment in only one of the two movement directions 54, 55 of the center pivot irrigation system 1. For the purpose of this disclosure, the term "sensor" should be construed to include devices for measuring a varying degree of misalignment of the irrigator spans. The sensors 40, 41 can provide either an analog or digital output signal quantifying the degree of this misalignment. This contrasts with both the legacy limit switch alignment method that provides only an on/off signal to correct misalignment and the alignment methods that use a single sensor to detect degrees of misalignment in both directions as disclosed by Krieger and Malsam.

The variable-speed-speed drive assembly 35 may include a dual sensor alignment detector 49 with first and second sensors 40, 41, an irrigator span motor 38, wheels 36, and a variable-speed drive controller 39. The variable-speed drive controller 39 typically used by the present invention may include a dual sensor alignment detector 49 with first and second sensors 40, 41 to detect and signal misalignment of the intermediate irrigator spans 12, 13 and end irrigator span 14. In a preferred embodiment, the first sensor 40 detects misalignment in a forward movement direction 54, and the second sensor 41 detects misalignment in a reverse movement direction 55. The corresponding signal status of the sensors 40 and 41 signal to the variable-speed controller 39 of the variable-speed drive assembly 35 to enable changes in span motor 36 speed in either a forward movement direction 54, signaled by the first sensor 40, or a reverse movement direction 55, signaled by the second sensor 41. The output signals of the sensors 40, 41 of dual sensor alignment detector 49 are used to achieve and maintain substantial straight alignment with constant tension within and between the plurality of intermediate irrigator spans 12, 13 and end irrigator spans 14 in either a forward movement direction 54 or a reverse movement direction 55 while the irrigation system 1 is operating.

Figure 2:
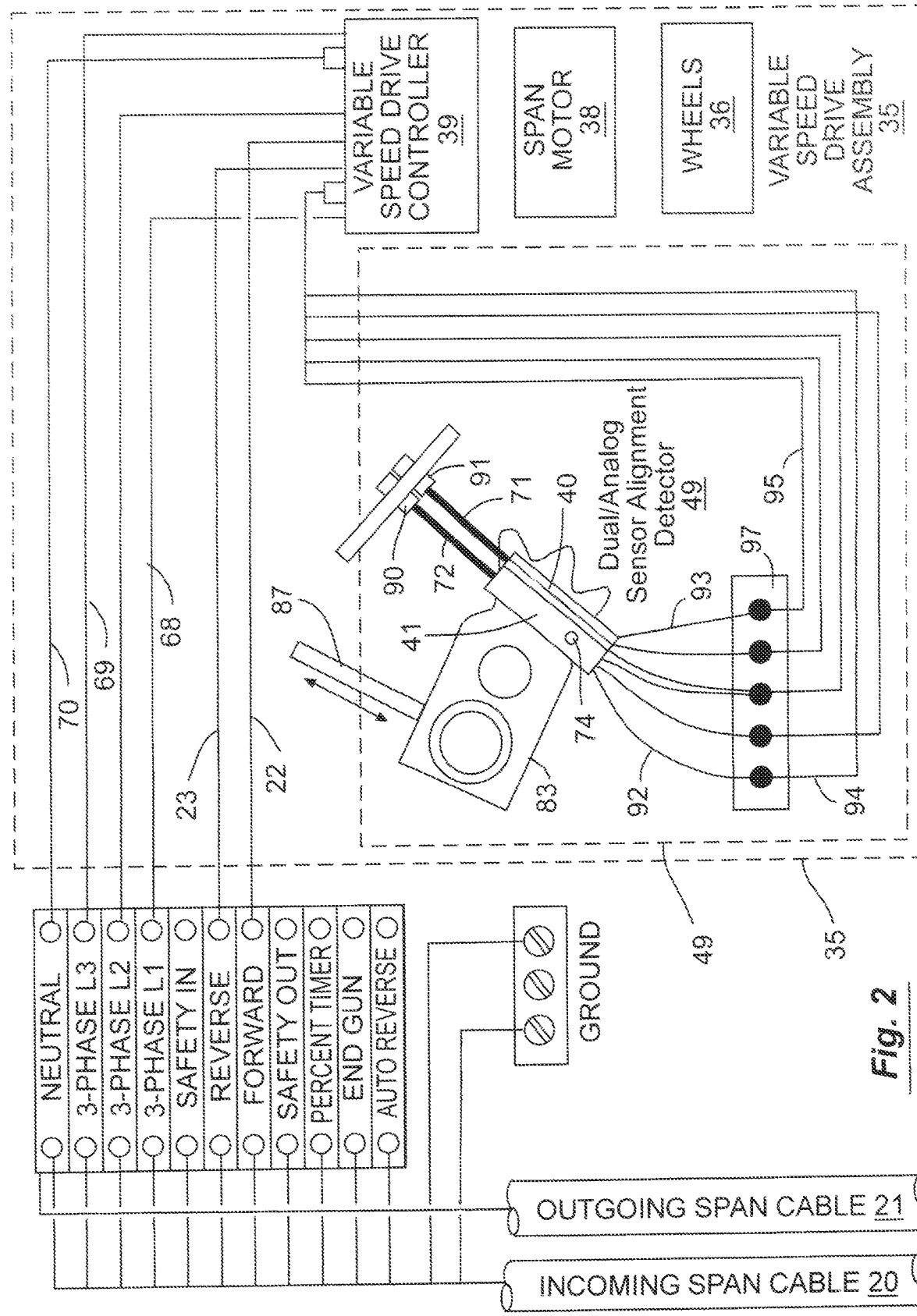
FIG. 2 is a simplified wiring diagram of the dual sensor alignment detector 49 and the major components of an irrigation system 1.
Figure 3:
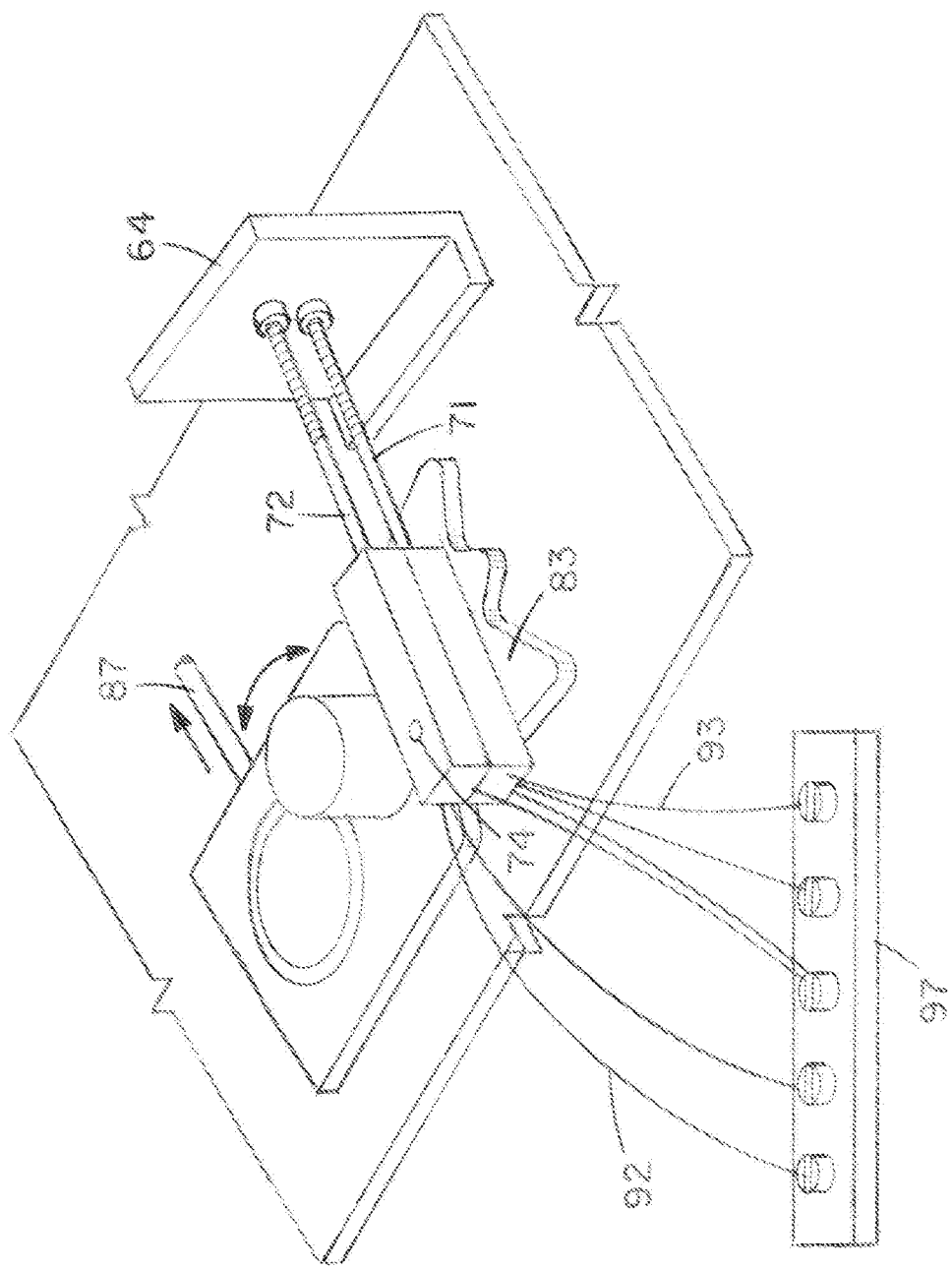
FIG. 3 illustrates a variable-speed drive assembly 35 with a variable-speed drive controller 39 signaled by a dual sensor alignment detector 49. The dual sensor alignment detector 49 includes two sensors 40, 41 with two sensor actuator shafts 71, 72 connected to a cam 83 by a pivoting pin 74.

FIGS. 2 and 3 illustrate a variable-speed drive assembly 35 with a variable-speed drive controller 39 configured to modify aspects of 3-phase AC (alternating current) supply power delivered over conductor L1 68, conductor L2 69 and conductor L3 70 of the incoming span cable 20 in either a forward movement direction 54 or a reverse movement direction 55 (FIG. 1), such direction of movement communicated conventionally to variable-speed drive controller 39 by forward movement direction signal 22 and reverse movement direction signal 23, respectively. The variable-speed drive controller 39 is also signaled by a first sensor output value 92 and a second sensor output value 93 from the first sensor 40 and second sensor 41, respectively, of the dual sensor alignment detector 49. The dual sensor alignment detector 49 including a first sensor 40 and a second sensor 41, both mounted to a cam 83 by a pivoting pin 74 (FIGS. 2 and 3) and including a first sensor actuator shaft 71 and a second sensor actuator shaft 72, each configured to detect rotational movement of the cam 83 as the first sensor actuator shaft 71 and second sensor actuator shaft 72 are compressed and uncompressed against a first adjustable set-screw 90 and a second adjustable set screw 91, respectively, of the stationary back plate 64. This compressing and uncompressing of the sensor actuator shafts 71 and 72, respectfully, is caused by rotational movement of the cam 83 driven by the rod 87 moved by a mechanical alignment mechanism of a corresponding flexible joint 3 (FIG. 4) of the intermediate irrigator spans 12, 13 and end irrigator span 14 (FIG. 1). The continuous compressing and uncompressing of the sensor actuator shafts 71,72 causes two sensor output values 92, 93, respectively, to each be continuously communicated to the variable-speed drive controller 39 over signal wires 94, 95, respectively, through the 5-wire terminal strip 97.

FIG. 3 is a three-dimensional view of the dual sensor alignment detector 49 illustrating the connection of the sensors 40, 41 to the cam 83 by the pivoting pin 74.

Figure 4:
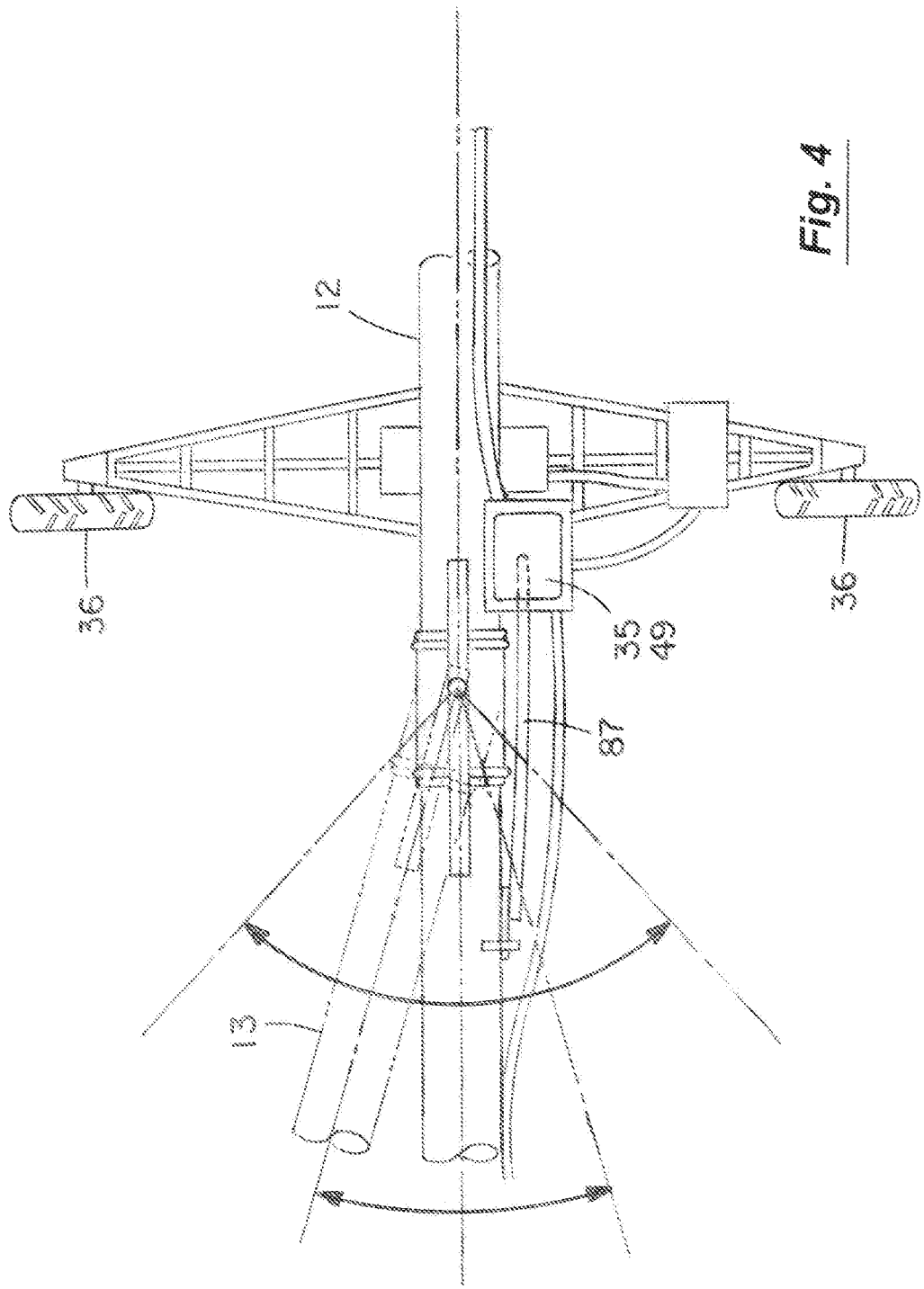
FIG. 4 is a top view of a flexible joint 3 between two intermediate irrigator spans 12, 13 illustrating the limited range of alignment between the intermediate irrigator spans 12, 13.

FIG. 4 is a top view of two intermediate irrigator spans 12, 13 and a flexible joint 3 therebetween illustrating predetermined alignment limits between the intermediate irrigator spans 12, 13.

Figure 5:
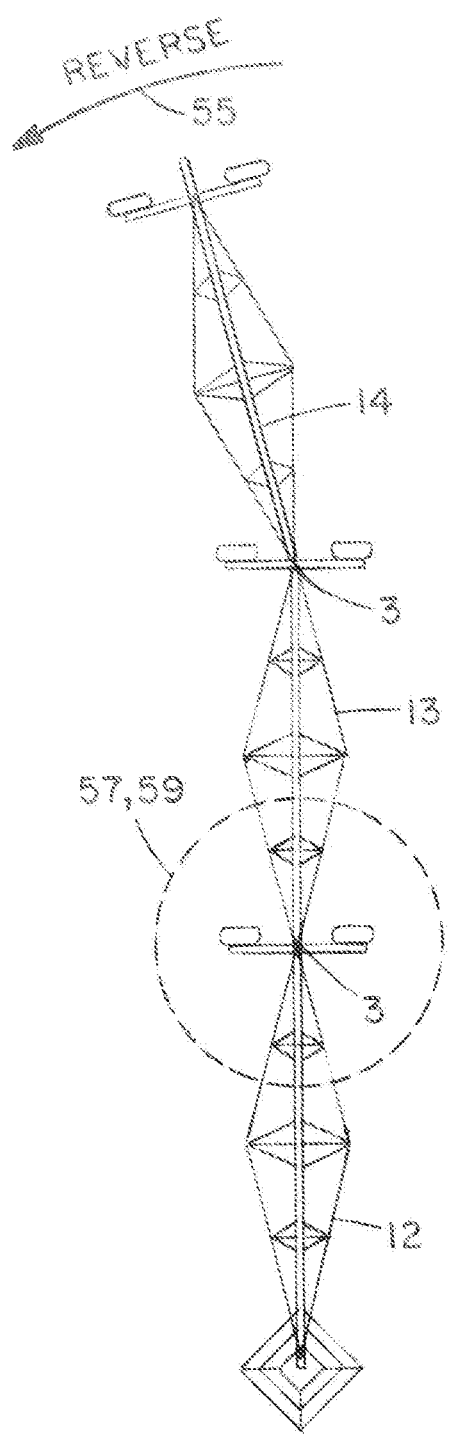
FIG. 5 is a top view of an irrigation system 1 with the two intermediate irrigator spans 12, 13 aligned and the end irrigator span 14 in a leading bow for the reverse movement direction 55.
Figure 6:
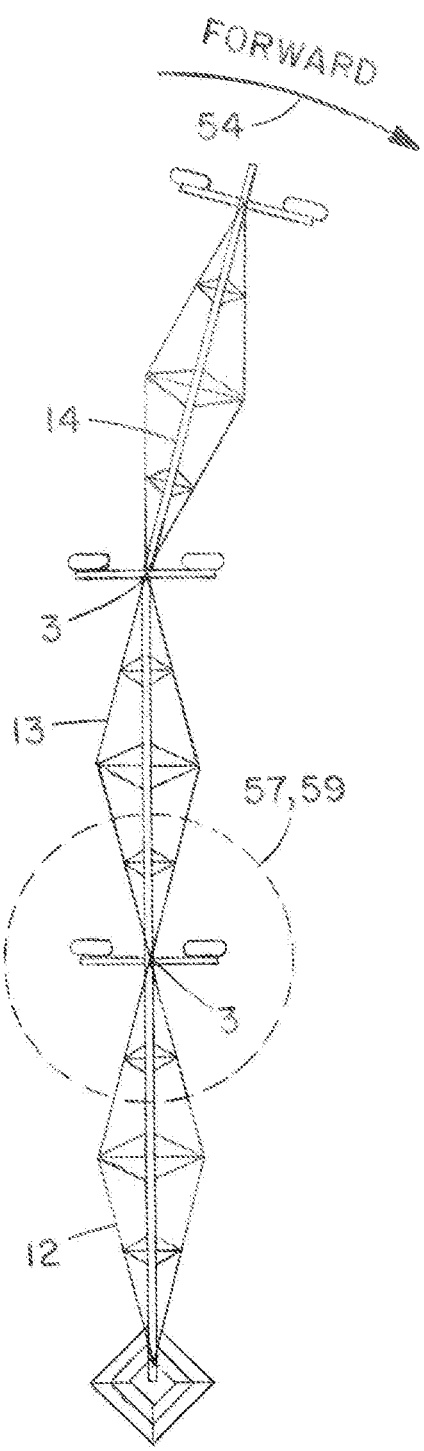
FIG. 6 is a top view of an irrigation system 1 with the two intermediate irrigator spans 12, 13 aligned and the end irrigator span 14 in a leading bow for the forward movement direction 54.
Figures 7, 8:
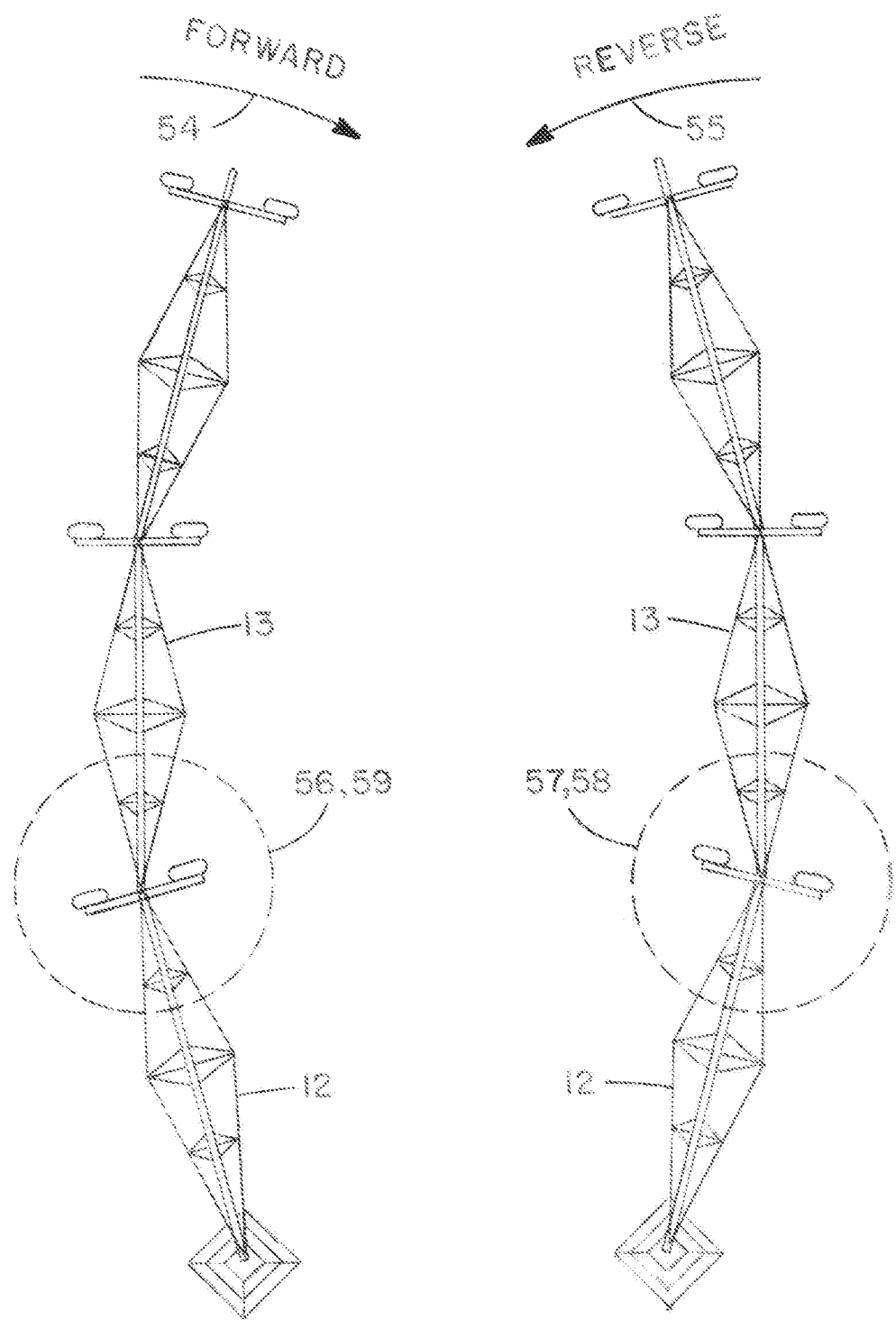
FIG. 7 is a top view of an irrigation system 1 with the intermediate irrigator spans in a leading bow for the forward movement direction 54.
FIG. 8 is a top view of an irrigation system 1 with the intermediate irrigator spans in a leading bow for the reverse movement direction 55.

FIGS. 5 and 6 are illustrations of the respective longitudinal axes of the intermediate irrigator spans 12, 13, with deviations in alignment of the end irrigator span 14 in either a forward movement direction 54 or a reverse movement direction 55. FIG. 7 is a top view of an irrigation system 1 with the intermediate irrigator spans 12,13 and end irrigator span 14 in a leading bow for the forward movement direction 54. FIG. 8 is a top view of an irrigation system 1 with the intermediate irrigator spans 12,13 and end irrigator span 14 in a leading bow for the reverse movement direction 55.

FIG. 1 illustrates an irrigation system 1 in accordance with the present invention. Examples of irrigation systems 1 include linear or lateral move irrigation systems 1, center pivot irrigation systems 1, or the like. FIG. 1 illustrates an embodiment of the present invention wherein the irrigation system 1 is a center pivot irrigation system 1, however, it is contemplated that the present invention may be implemented with other types of irrigation systems 1 including linear and lateral move irrigation systems 1. As shown, the irrigation system 1 may include a center pivot tower structure 2, a main section assembly 10 coupled or connected to the center pivot tower structure 2. The center pivot tower structure 2 has access to a water source to furnish water to the irrigation system 1.

The main section assembly 10 includes a number of interconnected intermediate irrigator spans 12, 13 with applicant conduits 24, 25 that are each supported by a truss-type framework structure 6, 7 and by one or more intermediate tower structures 30, 31 and an interconnected end irrigator span 14 with applicant conduit 26 that is supported by a truss-type framework structure 8 and by an end tower structure 32. The intermediate tower structures 30, 31 and end tower structure 32 are configured to travel about the center pivot tower structure 2 in a circular path that creates wheel tracks 50, 51, 52. The intermediate tower structures 30, 31 and end tower structure 32 may be any tower configuration known in the art to adequately support the applicant conduits 24, 25, 26, e.g., pipes, described herein. It is to be understood that the main section assembly 10 may include any number of intermediate irrigator spans 12,13 and end irrigator span 14 and intermediate tower structures 30, 31 and end tower structure 32. The direction of travel for the main section assembly 10 can be either a forward movement direction 54 or a reverse movement direction 55.

The intermediate tower structures 30, 31 and the end tower structure 32 each may include one or more wheels 36, to assist in traversing the irrigation system 1 so as to pivot the main section assembly 10 about a ground surface, cultivation area or field in a forward movement direction 54 or a reverse movement direction 55 along wheel tracks 50, 51, 52. As shown in FIG. 1, each intermediate irrigator span 12, 13 and end irrigator span 14 may include applicant conduits 24, 25, 26 that are configured to carry liquid, e.g., applicant, along the length of the irrigation system 1 to one or more applicant dispersal assemblies (not shown) that are configured to irrigate the cultivation area. Each applicant conduit 24, 25, 26 may be coupled to one another to allow fluid communication between each applicant conduit 24, 25, 26. In an implementation, the applicant conduits 24, 25, 26 may be supported by truss-type framework structures 6, 7, 8. Thus, the main fluid displacement device may be configured to displace applicant through the applicant conduits 24, 25, 26. As shown in FIG. 1, the irrigation system 1 also may include a cantilevered boom structure 5 that extends outwardly from the end tower structure 32.

Both the forward movement direction 54 and the reverse movement direction 55 are dependent on the direction of rotation of the central shafts of the rotors of the irrigator span motors 38. The wiring configuration of 3-phase AC supply power conductor-L1 68, conductor-L2 69, and conductor-L3 70, included in the incoming span cable 20 and outgoing span cable 21, may be configured to result in either a clockwise rotation or a counter clockwise rotation of the central shafts of the rotors of the irrigator span motors 38. Simply reconfiguring two of the three 3-phase AC supply power (i.e., conductor-L1 68, conductor-L2 69, and conductor-L3 70) results in a reversal of the rotation of the central shafts of the rotors of the irrigator span motors 38. Thus, in operation, the forward movement direction 54 or reverse movement direction 55 for irrigation system 1 is conventionally changed, both in the prior art and in the system of the present invention, from forward to reverse or reverse to forward using an electromechanical contactor device, controlled by an operator and typically located at a central control panel (not shown), that is typically connected to span cable out 20 at the central control panel (not shown) at a center pivot tower structure 2 (FIG. 1). The conventional operation of said electromechanical contactor device configures 3-phase AC supply power consisting of conductor-L1 68, conductor-L2 69, and conductor-L3 70 in incoming span cable 20 to provide either a clockwise rotation or a counter clockwise rotation of the central shafts of the rotors of the irrigator span motors 38 that results in the desired forward movement direction 54 or reverse movement direction 55, as selected by an operator.

With reference to FIG. 2, it should also be noted that typically the same electromechanical contactor device, controlled by an operator and typically located at a central control panel (not shown), configures 3-phase AC supply power conductor-L1 68, conductor-L2 69, and conductor-L3 70 to set the rotation of the central shafts of the rotors of irrigator span motors 38 to result in either a forward movement direction 54 or a reverse movement direction 55, also communicates the respective forward movement direction signal 22 or reverse movement direction signal 23 to the variable-speed drive controller 39.

Continuing with FIG. 2, each variable-speed drive assembly 35 may include a dual sensor alignment detector 49 comprised of a first sensor 40 and a second sensor 41, a cam 83, and a rod 87, an irrigator span motor 38, wheels 36, and a variable-speed drive controller 39 that varies aspects of the supply power, i.e., varies the speed, furnished to the corresponding span motor 38. The forward movement direction signal 22 and reverse movement direction signal 23 are communicated to the variable-speed drive assembly 35 by way of incoming span cable 20 and outgoing span cable 21. The forward movement direction signal 22 and reverse movement direction signal 23 are each discretely connected by wire or other means to the variable-speed drive controller 39.

Continuing with FIG. 2, the forward movement direction signal 22 circuit and the reverse movement direction signal 23 circuit are each conventionally connected to the variable-speed drive controller 39 (although in an embodiment this configuration could be different). The dual actuation of both sensors 40, 41 may be achieved by cam 83 being rotated by movement of one or more rods 87. In an implementation of the present invention, one or more intermediate tower structures 30, 31 may be controlled by a suitable variable-speed drive assembly 35, or the like, to assist in traversing the irrigation system 1 over a respective ground surface, cultivation area or field. For example, each intermediate tower structure 30, 31 may include a variable-speed drive assembly 35 to propel the respective intermediate tower structure 30, 31 over a respective ground surface, cultivation area or field in either a forward movement direction 54 or a reverse movement direction 55. It should be noted that the present invention does not require a variable-speed drive assembly 35 at the end tower structure 32. In contrast with intermediate tower structures 30, 31 the end tower structure 32 does not require an alignment adjustment and can be controlled using a fixed-speed drive controller (legacy drive), a variable-speed drive controller 39, or by other means known in the art.

As described above, the variable-speed drive assembly 35 may incorporate one or more span motors 38 configured to drive the irrigation system 1 in a forward movement direction 54 or a reverse movement direction 55 based on the configuration of 3-phase AC supply power conductor-L1 68, conductor-L2 69, and conductor-L3 70. In either a forward movement direction 54 or a reverse movement direction 55, the alignment between each intermediate irrigator span 12, 13 and between the outermost intermediate irrigator span 13 and end irrigator span 14 of the irrigation system 1 may be maintained by the rotation of one or more cams 83, rotated by one or more rods 87, such cams 83 may include a first sensor 40 with a first sensor actuator shaft 71 and a second sensor 41 with a second sensor actuator shaft 72 being compressed and uncompressed, the degree of such compression and decompression controlled by two adjustable set screws 90, 91 of back plate 64, FIG. 3, thereby communicating sensor output values 92, 93 to the corresponding variable-speed drive controller 39 to control the speed of irrigator span motor 38 at each intermediate irrigator span 12, 13 flexible juncture 3 on the intermediate tower structures 30, 31. The continuous compressing and uncompressing of the sensor actuator shafts 71, 72 of sensor one 40 and sensor two 41, respectfully, against adjustable set screw one 90 and adjustable set screw two 91, respectively, of stationary back plate 64 causes the sensor output values 92, 93 to be continuously communicated to the variable-speed drive controller 39 over signal wires 94, 95 through the 5-wire terminal strip 97.

Assuming a forward movement direction 54, the first sensor 40 may be configured to continuously communicate a first sensor output value 92 to result in a discrete speed for the irrigator span motor 38, such speed being necessary to maintain alignment of intermediate irrigator spans 12, 13 in a forward movement direction 54. Similarly, assuming a reverse movement direction 55, the second sensor 41 may be configured to continuously communicate a second sensor output value 93 to result in a discrete speed for span motor 38, such speed being necessary to maintain alignment of intermediate irrigator spans 12, 13 in a reverse movement direction 55.

As shown in FIG. 2, each variable-speed drive assembly 35 may include a variable-speed drive controller 39. A non-limiting list of suitable variable-speed drive controller 39 types includes an AC (alternating current) VFD (variable frequency drive), a variable-torque V/Hz (volts-per-hertz) control VFD, a flux control VFD, a DTC (direct torque control) VFD, a sensorless vector control VFD, a sensored vector control VFD, a brush type DC (direct current) variable-drive control unit, or a DC variable-drive control unit, and the like, all with or without an internal or an external microcontroller or an internal or an external PLC (programmable logic controller).

While FIG. 2 illustrates that the variable-speed drive controller 39 can be incorporated inside, e.g., housed within, the variable-speed drive assembly 35, it is to be understood that the variable-speed drive controller 39 may be a stand-alone unit.

As shown in FIG. 2, the variable-speed drive controller 39 may be directly connected with the sensors 40, 41 (e.g., via a wired connection) of the dual sensor alignment detector 49. A non-limiting list of suitable sensor 40, 41 types includes a potentiometer, a capacitive alignment sensor, a GPS (global positioning system)-based alignment sensor, a laser-based alignment sensor, a non-contact proximity sensor, or any other device capable of signaling varying states of alignment, and the like. The dual sensor alignment detector 49 may result in the sensors 40, 41 being actuated by the movement of a cam 83 (similarly shown in FIGS. 2 and 3) on a shaft connected to a corresponding rod 87 associated with a corresponding intermediate irrigator span 12, 13. The sensors 40, 41 may be used to communicate sensor output values 92, 93 to signal a discrete speed setting for the irrigator span motor 38 in both movement directions 54, 55, respectively.

Conventionally, selection of either a forward movement direction 54 or a reverse movement direction 55 by operators of irrigation system 1, using a central control panel (not shown) at center pivot tower structure 2 or a remote control system at one or more intermediate tower structures 30, 31 or end tower structure 32, determines whether the forward movement direction signal 22 or the reverse movement direction signal 23 (as shown in FIG. 2) is present, i.e., carrying either a forward movement direction signal 22 or a reverse movement direction signal 23 to the variable-speed drive controller 39.

With reference to FIG. 2, the dual sensor alignment detector 49 may include sensors 40, 41 actuated by a cam 83, wherein the cam 83 may already be included and configured in the installed base of existing electric powered irrigation systems 1. As such, the basic elements and components of the prior art can be readily used with the present invention to signal a lagging state of alignment 56 (FIG. 7), a non-lagging state of alignment 57 (FIG. 8), a leading state of alignment 58 (FIG. 8), or a non-leading state of alignment 59 (FIG. 7) between the corresponding intermediate irrigator spans 12, 13 and the end irrigator span 14 for either movement direction 54, 55 as illustrated in FIGS. 6 and 7.

Each of the sensor actuator shafts 71,72 of the sensors 40,41, respectively, when compressed into adjustable set screws 90, 91, respectively, may be configured to communicate sensor output values 92, 93 to the variable-speed drive controller 39 when a respective intermediate irrigator span 12, 13 is in a lagging state of alignment 56, a non-lagging state of alignment 57, a leading state of alignment 58, or a non-leading state of alignment 59 (FIGS. 7 and 8).

Each sensor 40, 41 may be in communication with a variable-speed drive controller 39 of a variable-speed drive assembly 35 of the irrigation system 1. In response to variable-speed drive controller 39 receiving either a forward movement direction signal 22 or a reverse movement direction signal 23 from an incoming span cable 20 (FIG. 2), the variable-speed drive controller 39 uses the sensor output values 92, 93 communicated from the first sensor 40, forward movement direction 54, or the signal from second sensor 41, reverse movement direction 55, to adjust the speed of the irrigator span motor 38. The variable-speed drive controller 39, in turn, is configured to monitor and process the sensor output value 92 and sensor output value 93 of the dual sensor alignment detector 49 over signal wires 94, 95, respectively, and to furnish to the corresponding span motor 38 a speed setting that maintains alignment of intermediate irrigator span 12, 13 and end irrigator span 14.

Although the subject matter has been described in language specific to structural features or process operations, it is to be understood that the subject matter defined in the appended claims is not necessarily limited to the specific features or acts described above. Rather, the specific features and acts described above are disclosed as example forms of implementing the claims.

We claim:

1. An irrigation system having both a forward movement direction and a reverse movement direction over a ground surface of a field, the irrigation system comprising:
   at least one intermediate irrigator span and at least one end irrigator span each having a longitudinal axis, the intermediate irrigator span and the end irrigator span being connectable to each other at a flexible juncture with the respective longitudinal axes of the intermediate irrigator span and the end irrigator span in a linear alignment;
   an intermediate tower structure between the intermediate irrigator span and the end irrigator span configured to support the intermediate irrigator span and the end irrigator span above a ground surface;
   a variable-speed drive assembly having:
   (a) at least one wheel configured to contact a ground surface below the intermediate tower structure;
   (b) at least one span motor configured to drive at least one wheel to propel the intermediate tower structure over the ground surface;
   (c) a dual sensor alignment detector detecting alignment of the respective longitudinal axes of the intermediate irrigator span and the end irrigator span, having a first sensor detecting alignment only when moving in the forward movement direction and a second sensor detecting alignment only when moving in the reverse movement direction; and
   (d) a drive controller (i) controlling the speed of the variable-speed drive assembly when moving in the forward movement direction based only on the first sensor maintaining said linear alignment of the longitudinal axes of the intermediate irrigator span and the end irrigator span and (ii) controlling the speed of the variable-speed drive assembly when moving in the reverse movement direction based only on the second sensor maintaining said linear alignment of the longitudinal axes of the intermediate irrigator span and the end irrigator span.

2. The irrigation system of claim 1 wherein the first sensor and the second sensor of the dual sensor alignment detector comprise at least one of a potentiometer, a capacitive alignment sensor, a GPS-based alignment sensor, a laser-based alignment sensor, and a non-contact proximity sensor.

3. An irrigation system having both a forward movement direction and a reverse movement direction over a ground surface of a field, the irrigation system comprising:
   a plurality of interconnected irrigator spans in a linear alignment with each other;
   a plurality of intermediate tower structures for supporting the interconnected irrigator spans, with each intermediate tower structure having a variable-speed drive assembly for selectively driving the intermediate tower structure at a selected speed in said forward movement direction and in said reverse movement direction, said variable-speed drive assembly having:
   (a) a first sensor detecting alignment of the interconnected irrigator spans only when moving in the forward movement direction;
   (b) a second sensor detecting alignment of the interconnected irrigator spans only when moving in the reverse movement direction; and
   (c) a variable-speed drive controller in communication with the first sensor and second sensor configured (i) to control the speed of the variable-speed drive assembly when moving in the forward movement direction based only on the first sensor maintaining said linear alignment of the interconnected irrigator spans and (ii) to control the speed of the variable-speed drive assembly when moving in the reverse movement direction based only on the second sensor maintaining said linear alignment of the interconnected irrigator spans.

\* \* \* \* \*